3,226,456
METHOD OF PRODUCING HIGH DENSITY CERAMIC ARTICLES
Eugene I. Ryshkewitch, Ridgewood, Adolf J. Strott, Clifton, and Donald L. Utz, Pompton Lakes, N.J., assignors to National Beryllia Corp., Haskell, N.J., a corporation of New Jersey
No Drawing. Filed Mar. 27, 1963, Ser. No. 268,475
7 Claims. (Cl. 264—.5)

This application is a continuation-in-part of our copending application, Serial No. 7,113, filed February 8, 1960, now abandoned.

This invention relates to new ceramic articles of high purity and a density approaching the theoretical density. More particularly, the invention relates to new ceramic articles of metal oxides, such as alumina, beryllia, and similar refractory oxides. The invention also relates to a novel method for producing such new ceramic articles.

One of the problems in the production of ceramic products from high purity metal oxides has been the difficulty in obtaining products of high density. Whereas high density ceramic products can be made from less pure metal oxides, e.g., 90–98% purity, without difficulty by hot or cold pressing operations, the employment of high purity metal oxides, e.g., above about 99% purity, results in the formation of products with 2 or 3% up to 20%, or even more, by volume of occluded gases.

The employment of increased temperatures and pressures, which would normally be expected to reduce the amount of the occluded gases, has also been unsuccessful. Under increased pressures, the entrapped gases tend to cause an undesirable lamination effect in the compressed body. Also, the increased pressure accelerates the deterioration of the molds for the hot pressing process when they are constructed of a material such as graphite.

Because of the above-described difficulties, it has not been possible to produce the desired high purity, high density ceramic products by conventional pressing and casting methods, with the result that the art has been forced to compromise its objectives and make a choice between high purity and high density rather than being able to achieve a combination of these desired properties.

The present invention provides a means for producing shaped ceramic articles of high purity and high density, which properties were heretofore desired but unattainable. The ceramic products of the invention have a density closely approaching the theoretical density and have a purity which is above 99%. Moreover, in accordance with the invention, these improved products are produced by a method which is relatively simple and which does not greatly increase the cost of the product.

These new and improved ceramic articles are produced in accordance with the present invention by intimately mixing with a metal oxide a small amount of the same metal in powdered form to produce a substantially uniform mixture which may be formed into desired shapes by any of the conventional forming methods, e.g., hot pressing, cold pressing, extrusion, or slip casting.

The metal oxides employed in the production of the shaped ceramic articles of the invention may be refractory oxides, such as alumina, beryllia, magnesia, thoria, and zirconia.

Since the invention is particularly applicable where high purity products are desired, the starting metal oxide materials will generally have a purity above about 99%. When beryllia products are desired, the beryllia starting material will generally have a purity in the range of about 99.7% or more.

The metal mixed with the oxide, as stated above, is the same as that present in the oxide. For example, if the oxide is beryllia, then the metal employed would be beryllium, or if the oxide is alumina, then the metal employed would be aluminum. The metal added to the oxide is in a finely divided state so that the metal may be mixed substantially uniformly throughout the metal oxide. Generally, particle sizes from about 1 to 40 microns are employed, with sizes in the range of 5 to 25 microns being preferred.

The proportion of metal mixed with the oxide prior to the forming operations will vary with the particular oxide being employed and the purity thereof. In general, the proportion is between about 0.02% and 0.1% by weight of the oxide. Preferably, the amount of the metal added will be between about 0.03% and 0.06% by weight.

The metal and the metal oxide may be mixed with any suitable mixing apparatus so long as a uniform mixture is produced. Advantageously, the mixing may be performed by wet mixing the ingredients in a ball mill.

As pointed out above, by employing the method of the present invention, ceramic bodies having extremely high density, for example, greater than 99% of the theoretical value, may easily and conveniently be made by conventional forming methods. Among the methods which have been found to be particularly suitable are hot and cold pressing, as well as extrusion and slip casting.

Although the mechanism by which the added metal facilitates the production of the ceramic articles of high density and high purity is not known with certainty, it is believed that the metal may in part act as a lubricant to increase the plasticity of the mixture and so that the occluded gases may more easily be expelled from the body during the forming operation. The added metal also may act as a getter by chemically combining with the occluded gas to form small amounts of the corresponding oxides and nitrides.

The products which are produced by the novel process of this invention are believed to be new compositions of matter in that they are comprised of a metal oxide, such as aluminum oxide, derived from a mineral source such as, alumina, and metal oxide, such as aluminum oxide, which is formed in situ from the in situ reaction of free metal corresponding to the metal component of the metal oxide, and occluded oxygen present in the interstices of the mass at the time it is submitted to the pressures and temperatures of formation. Although the amount of metal oxide formed in situ is quite small, it is nevertheless an extremely important component by virtue of its impurity reducing properties for the entire mass. These products are unique in that they approach a mono-crystalline structure but are, nevertheless, polycrystalline products.

Various aspects of the invention will be more fully understood from the following examples and the accompanying discussion.

*Example I*

1 gram of powdered aluminum metal having a purity of about 99.5% and having a particle size between about 3 and 25 microns was mixed with 3,000 grams of alumina of a purity of about 99.5%. A substantially uniform distribution of the powdered metal throughout the metal oxide was achieved by wet milling the mixture in a ball mill containing alumina balls ½ inch in diameter.

After wet milling in alcohol in the ball mill for 4 hours, the resulting dried mixture containing 0.03% of aluminum metal was hot pressed into the shape of a disc using graphite molds which were electrically heated to a temperature of 1825° C. The pressure employed during the forming operation was in the range of about 200 kg./cm.$^2$.

The alumina disc formed having a size 5½ inches in diameter and 2 inches high was examined and found to have slightly grayish color and to possess a fine microstructure. The density of the alumina disc measured by the water displacement method was 3.97 as compared with the theoretical value of 3.98. The purity of the disc was found to be better than 99.5% of $Al_2O_3$.

Microscopical examination of the polished surface and of the thin sections of the disc did not reveal any cavities or pores. No metal particles are detectable. The compressive, tensile, and bending strengths of the article produced were found to be approximately 25 to 30% greater than articles produced by conventional methods.

*Example II*

The procedure of this example was the same as that of Example I with the following exceptions:

0.9 gram of finely powdered pure beryllium metal having a particle size between about 5 and 25 microns in diameter was mixed with 2250 grams of beryllia of a purity above 99.5% by wet milling in alcohol in a ball mill with alumina balls for 4 hours. The resulting dried mixture containing about 0.04% of beryllium metal was hot-pressed in the form of a solid disc in a graphite mold, electrically heated up to 1800° C. The applied pressure was about 200 kg./cm.².

The disc was 5½ inches in diameter and 2 inches thick. It was of slightly grayish color. Microscopical examination revealed no gaps, pores or other imperfections in the disc, and the grain structure was fine and uniform. The improvement in mechanical strength reported in Example I was also observed.

The specific gravity of the disc, determined by the water displacement method, was found to be 3.00, as compared with the theoretical value 3.01.

As indicated above, the products of the present invention are cast in various geometric forms usually utilizing graphite dies. Heating and pressing to form the articles takes place simultaneously, and we prefer to use a high frequency electric furnace as the heat source. The temperature of the metal oxide body should be no less than 1700° C. for any size or configuration. The maximum temperature at which the products of this invention may be produced is up to about 2400° C. However, at the higher temperatures, i.e., above about 1850° C., the products have lower strength because crystal growth, which has been found detrimental, occurs to an undesired extent. Best results are secured in the temperature range of from about 1775° C. to about 1850° C.

The pressure at which the products of the present invention are formed is at least about 2000 p.s.i. Any pressure above this may be used, but for practical purposes, this is limited by the die strength. With graphite the maximum pressure which may be used is approximately 2500 p.s.i. In general, pressures in the range of 140 to about 250 kg./cm.² may be used, pressures of about 200 kg./cm.² being preferred.

The period of time over which the heating and pressing occurs is not critical and generally ranges from about 20 minutes to about 360 minutes, this factor being determined mainly by the mass and configuration of the article being cast. Articles weighing in the range of a few grams up to about 50 grams require periods of time in the range of from about 20 minutes to about 60 minutes. Articles as large as about 2500 grams will require heating and pressing times of about 360 minutes. The time is conventional for hot pressing techniques and is sufficient to raise the whole body to the desired temperature and permit the reactions of the free metal to occur.

The most desirable products produced in accordance with the process of this invention contain 0.0% metal in the final product. For practical purposes, these products are metal-free.

From the foregoing, it will be appreciated that the new ceramic products of the present invention provide the heretofore desired but unattainable combination of high purity (over 99%) and high density (over 99% of the theoretical value). Moreover, the production of these new ceramic products in accordance with the method of the invention is relatively simple and does not greatly increase the cost of the product.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A method for producing high density ceramic articles of high purity which comprises intimately mixing a metal oxide selected from the group consisting of alumina, beryllia, magnesia, thoria, and zirconia, with between about 0.02 and 0.1% by weight of a finely divided metal which is the same as the metallic element in said oxide, said finely divided metal consisting essentially of particles of a size between about 1 and 40 microns, and shaping said mixture at a temperature which reaches a maximum of about 1825° C., and a molding pressure of about 200 kg./cm.² to form a product having a purity of 99%, a density greater than about 99% of the theoretical value for the respective metal oixde, and a free metal content less than 0.1%.

2. A method for producing high density ceramic articles of high purity which comprises intimately mixing a metal oxide having a purity of greater than about 99% and selected from the group consisting of alumina, beryllia, magnesia, thoria, and zirconia, which between about 0.02 and 0.1% by weight of a finely divided metal which is the same as the metallic element in said oxide, said finely divided metal consisting essentially of particles of a size between about 1 and 40 microns, and shaping said mixture at a temperature which reaches a maximum of about 1825° C., and a molding pressure of about 200 kg./cm.² to form a product having a purity above 99%, a density greater than about 99% of the theoretical value for the respective metal oxide and a free metal content less than 0.1%.

3. A method for producing high density ceramic articles of high purity which comprises intimately mixing a metal oxide selected from the group consisting of alumina, beryllia, magnesia, thoria, and zirconia, with between about 0.03 and 0.06% by weight of a finely divided metal which is the same as the metallic element in said oxide, said finely divided metal consisting essentially of particles of a size between about 1 and 40 microns, and shaping said mixture at a temperature which reaches a maximum of about 1825° C., and a molding pressure of about 200 kg./cm.² to form a product having a purity above 99%, a density greater than about 99% of the theoretical value for the respective metal oxide, and a free metal content less than 0.1%.

4. A method for producing high density ceramic articles of high purity which comprises intimately mixing a metal oxide having a purity of greater than about 99% and selected from the group consisting of alumina, beryllia, magnesia, thoria, and zirconia, with between about 0.02 and about 0.1% by weight of a finely divided metal which is the same as the metallic element in said oxide, said finely divided metal consisting essentially of particles of a size between about 5 and 25 microns, and shaping said mixture at a temperature which reaches a maximum of about 1825° C., and a molding pressure of about 200 kg./cm.² to form a product having a purity above 99%, a density greater than about 99% of the theoretical value for the respective metal oxide and a free metal content less than 0.1%.

5. A method for producing high density ceramic articles of high purity which comprises intimately mixing alumina having a purity of at least 99%, with between about 0.02 and 0.1% by weight of finely divided aluminum metal, consisting essentially of particles of a size between about 1 and 40 microns, and shaping said mixture at a temperature which reaches a maximum of about 1825° C., and a molding pressure of about 200 kg./cm.$^2$ to form a product having a purity above 99%, a density greater than about 99% of the theoretical value for alumina, and a free aluminum content less than 0.1%.

6. A method for producing high density ceramic articles of high purity which comprises intimately mixing beryllia having a purity of greater than about 99.5% with between about 0.02 and 0.1% by weight of finely divided beryllium metal, consisting essentially of particles of a size between about 1 and 40 microns, and shaping said mixture at a temperature which reaches a maximum of 1800° C., and a molding pressure of about 200 kg./cm.$^2$ to form a product having a purity above 99.5% of the theoretical value for beryllia, and a free beryllium content less than 0.1%.

7. A method for producing high density ceramic articles of high purity which comprises intimately mixing a metal oxide selected from the group consisting of alumina, beryllia, magnesia, thoria, and zirconia, with between about 0.02 and about 0.1% by weight of a finely divided metal which is the same as the metallic element in said oxide, said finely divided metal consisting essentially of particles of a size between about 1 and 40 microns, and shaping said mixture at a temperature which reaches a maximum in the range of from about 1700° C. to about 2400° C., and a molding pressure in the range of from about 140 kg./cm.$^2$ to about 250 kg./cm.$^2$ to form a product having a purity above 99%, a density greater than about 99% of the theoretical value for the respective metal oxide, and a free metal content less than 0.1%.

References Cited by the Examiner

UNITED STATES PATENTS

| 2,030,200 | 2/1936 | Gallup | 264—56 |
| 2,568,157 | 9/1951 | Lepp et al. | 75—206 |
| 2,741,822 | 4/1956 | Udy | 23—14.5 |
| 2,947,056 | 8/1960 | Csordas et al. | 106—55 |

REUBEN EPSTEIN, *Primary Eaminer.*

CARL D. QUARFORTH, *Examiner.*